US010260492B2

(12) United States Patent
Octau et al.

(10) Patent No.: US 10,260,492 B2
(45) Date of Patent: Apr. 16, 2019

(54) METHOD FOR PRODUCING A PUMP BODY FOR THE DISPENSING OF A FLUID PRODUCT

(71) Applicants: Jean-Luc Octau, Intraville (FR); Jacky Lasnier, Sainte Marguerite sur Duclair (FR)

(72) Inventors: Jean-Luc Octau, Intraville (FR); Jacky Lasnier, Sainte Marguerite sur Duclair (FR)

(73) Assignee: Albea Le Treport S.A.S. (FR)

( * ) Notice: Subject to any disclaimer, the term of this patent is extended or adjusted under 35 U.S.C. 154(b) by 1257 days.

(21) Appl. No.: 14/040,154

(22) Filed: Sep. 27, 2013

(65) Prior Publication Data
US 2014/0086770 A1    Mar. 27, 2014

(30) Foreign Application Priority Data

Sep. 27, 2012 (FR) ...................... 12 59127

(51) Int. Cl.
*F04B 39/12* (2006.01)
*B05B 11/00* (2006.01)
*B29C 67/00* (2017.01)

(52) U.S. Cl.
CPC ........ *F04B 39/121* (2013.01); *B05B 11/3067* (2013.01); *B29C 67/0044* (2013.01);
(Continued)

(58) Field of Classification Search
CPC ............. B29C 67/0044; B29C 67/0048; Y10T 29/49236; B05B 11/00; B05B 11/3023; B05B 11/3067
See application file for complete search history.

(56) References Cited

U.S. PATENT DOCUMENTS

| 2,294,568 A | 9/1942 | Neilsen |
| 6,343,916 B1 | 2/2002 | Bougamont et al. |
| 7,237,569 B2 * | 7/2007 | Shieh ...................... F16K 15/04 137/533.13 |

FOREIGN PATENT DOCUMENTS

| EP | 1578537 B1 | 10/2007 |
| JP | H03154664 A | 7/1991 |

(Continued)

OTHER PUBLICATIONS

Dupont; "General Design Principles for DuPont Engineering Polymers" pp. 6-14 <http://www.dupont.com/content/dam/dupont/products-and-services/plastics-polymers-and-resins/thermoplastics/documents/General%20Design%20Principles/General%20Design%20Principles%20for%20Engineering%20Polymers.pdf> Copyright 2000.*

(Continued)

*Primary Examiner* — Jacob J Cigna
(74) *Attorney, Agent, or Firm* — St. Onge Steward Johnston & Reens, LLC

(57) ABSTRACT

A method of producing a pump body for dispensing fluid product, the body having a casing with an inlet orifice which includes a valve having a ball retained in a cage, the method includes: moulding the casing by forming ribs in relief having two lateral faces which join together along an internal edge and an upper end having a free upper surface; introducing the ball into the cage below the upper ends; deforming the upper ends to form visors extending radially towards the interior of the casing to imprison the ball in the cage; with the ribs being formed with their free surface extending from one lateral edge to the other by forming a dome having a top, with the deformation of the upper ends being provided by causing a matrix to bear against the tops then via axial displacement from the matrix on a stroke for crushing domes.

10 Claims, 3 Drawing Sheets

(52) U.S. Cl.
CPC ....... *B29C 67/0048* (2013.01); *B05B 11/3023* (2013.01); *Y10T 29/49236* (2015.01)

(56) References Cited

FOREIGN PATENT DOCUMENTS

JP       H03161066 A     7/1991
JP       2826847 B2 *  11/1998  ......... B05B 11/3067

OTHER PUBLICATIONS

English Translation of JP 2826847 B2.*

* cited by examiner

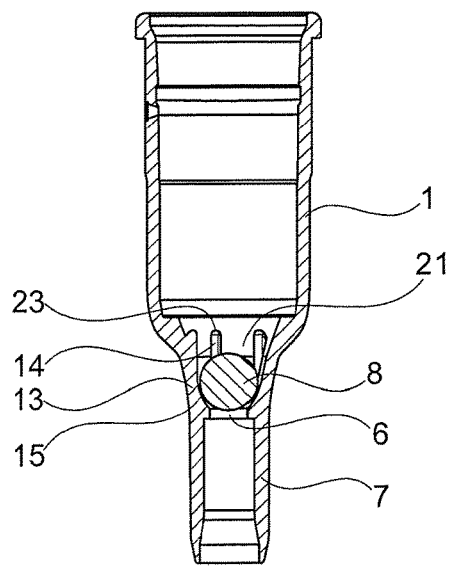
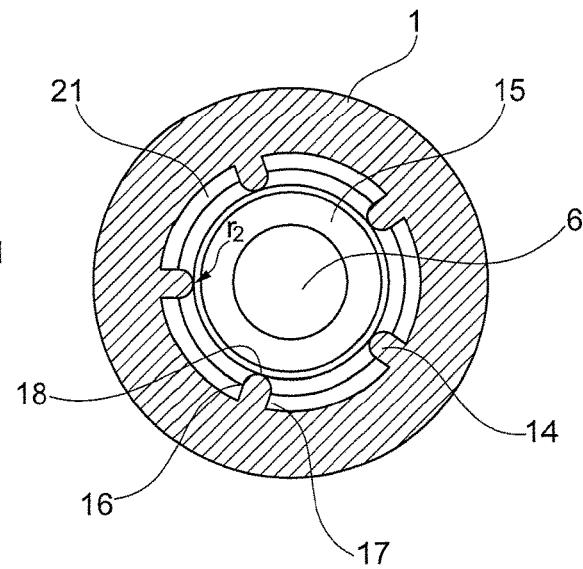
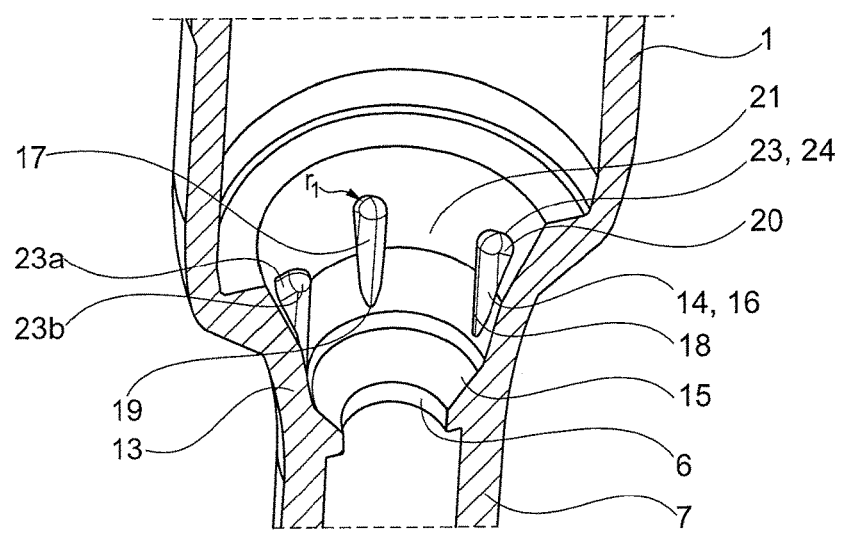
Fig. 2a  Fig. 2b
Fig. 2c

METHOD FOR PRODUCING A PUMP BODY FOR THE DISPENSING OF A FLUID PRODUCT

FIELD OF THE INVENTION

The invention relates to a method for producing a pump body for the dispensing of a fluid product, a pump body produced by this method as well as a pump comprising such a body.

BACKGROUND OF THE INVENTION

In particular, the pump is intended to be provided on a bottle wherein the product is conditioned, in particular a liquid product, a gel, a lotion or a cream, for example a care, makeup or perfumery cosmetic product, or a pharmaceutical product. In this application, the pump can be actuated manually in order to take the product and pressurise it with a view to dispensing it, for example in the form of an aerosol, a stream or a dab of product.

The pump comprises a body having a casing wherein a nozzle is mounted in reversible translation by defining inside said casing a metering chamber with variable volume. In order to allow for the supplying of the metering chamber with product, the casing is provided with an inlet orifice in communication with the conditioned product, with the metering chamber having an outlet valve for the pressurised product in said chamber.

The inlet orifice is provided with a valve comprising a ball which is retained in a cage in order to be displaced between a closed position and an open position of said orifice. In particular, on a dispensing stroke of the nozzle, the pressure in the metering chamber thrusts the ball in a sealed manner on the inlet orifice and, on a suction stroke of said nozzle, the vacuum in the metering chamber lifts the ball into open position of the inlet orifice in order to allow for the supplying of said chamber with product.

In order to carry out such a pump body, document EP-1 578 537 provides for:

moulding the casing by forming, on the inside of a peripheral wall surmounting the inlet orifice, ribs in relief which extend axially by being spaced angularly, with each of said ribs having two lateral faces that join together along an internal edge in order to delimit the cage between said edges, as well as an upper end having a free upper surface;

introducing the ball into the cage below the upper ends;

plastically deforming the upper ends in order to form visors extending radially towards the interior of the casing, said visors being arranged to imprison the ball in the cage.

In particular, the casing can be carried out by pressurised injection of a thermoplastic material of the polyolefin type, with the ductility of the ribs then authorising the cold heading of their free upper surface. As such, it is possible to combine a facility of moulding axial ribs with a reliability of the radial closing of the cage in order to imprison the ball. This is achieved without requiring an added part.

EP-1 578 537 proposes that the upper free surfaces of the ribs have a plane geometry forming an acute angle with the peripheral wall in order to facilitate the radial pulling back of the upper ends during the plastic deformation.

However, a fortiori at industrial production speeds of a magnitude of 5 to 10 parts per second, this production causes a sudden creeping of the material during the heading, weakening the bead of creep material which is then able to break into fragments which can mix with the product distributed.

Moreover, the geometry of the ribs according to prior art complicates the carrying out of the mould for producing the casing, in particular by requiring the use of a method of electro-erosion using pointed electrodes, which are fragile, in order to carry out as a hollow the moulding cavities of said ribs.

SUMMARY OF THE INVENTION

The invention aims to improve prior art by proposing in particular a method for producing a pump body wherein the stresses on the upper ends of the ribs during their plastic deformation are limited in order to suppress the risk of fragmentation of material in the product distributed. In particular, this improvement is obtained by being able to simplify the carrying out of the moulding cavities of the ribs, in particular via electro-erosion using electrodes without tips or by directly machining said cavities with a simple round bur.

The carrying out of visors according to the invention also makes it possible to limit the tangential creeping of the upper ends during their plastic deformation, in order to not reduce the flow section of the product supplying the metering chamber. As such, the pressure losses are not increased, which is particularly important for viscous products such as gels or creams.

To this effect, according to a first aspect, the invention proposes a method for producing a pump body for the dispensing of a fluid product, said body having a casing provided with an inlet orifice for said product which is provided with a valve comprising a ball retained in a cage for displacement between a closed position and an open position of said orifice, said method including the steps of:

moulding the casing by forming, on the inside of a peripheral wall surmounting the inlet orifice, ribs in relief which extend axially by being spaced angularly, with each of said ribs having two lateral faces that join together along an internal edge in order to delimit the cage between said edges, as well as an upper end having a free upper surface;

introducing the ball in the cage below the upper ends;

plastically deforming the upper ends in order to form visors extending radially towards the interior of the casing, said visors being arranged to imprison the ball in the cage;

the ribs being formed so that their free surface extends from one lateral edge to the other by forming a dome having a top, with the plastic deformation of the upper ends being carried out by causing a matrix to bear against said tops then via axial displacement of said matrix on a stroke for crushing domes.

According to a second aspect, the invention proposes a pump body carried out by implementing such a method, said body having a casing configured with an inlet orifice for providing a product and a valve comprising a ball retained in a cage for displacement between a closed position and an open position of said orifice. The casing comprises, on its peripheral wall which surmounts the inlet orifice, ribs in relief which extend axially by being spaced angularly, with each of said ribs having two lateral faces that join together along an internal edge in order to form the cage between said edges as well as an upper end. The ball is imprisoned in the cage by visors which are formed on the upper ends, said visors forming an internal extension which is protruding radially relative to the internal edge.

According to a third aspect, the invention proposes a pump for dispensing a fluid product comprising such a body and a nozzle mounted in reversible translation in the casing. The nozzle is mounted in reversible translation in the casing such that on a dispensing stroke of the product, the ball is in closed position of the inlet orifice and on a suction stroke of the product, the ball is in open position of the inlet orifice.

BRIEF DESCRIPTION OF THE DRAWINGS

Other purposes and advantages of the invention shall appear in the following description, made in reference to the annexed figures, wherein:

FIGS. 2a-2c show the body of the pump of FIG. 1 before plastic deformation of the upper ends of the ribs, respectively as a longitudinal section (FIG. 2a), as a transverse cross-section (FIG. 2b) and as a cut-off perspective (FIG. 2c), with the ball not shown in FIGS. 2b and 2c;

DETAILED DESCRIPTION OF THE INVENTION

Figure 1:
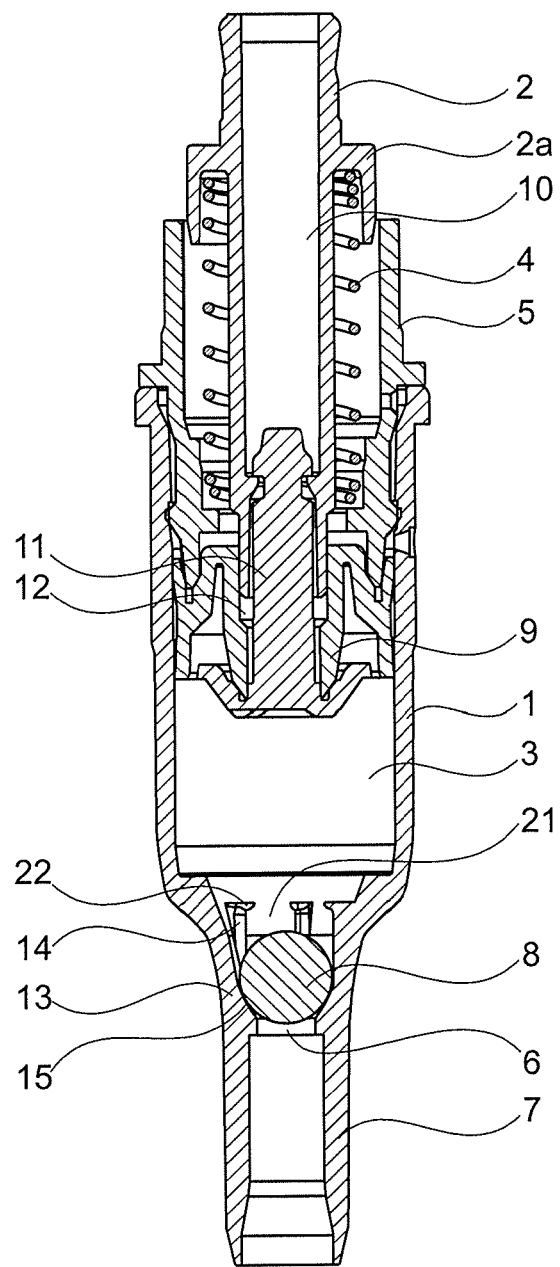
FIG. 1 shows the longitudinal section of a pump according to an embodiment of the invention.
Figure 3A:
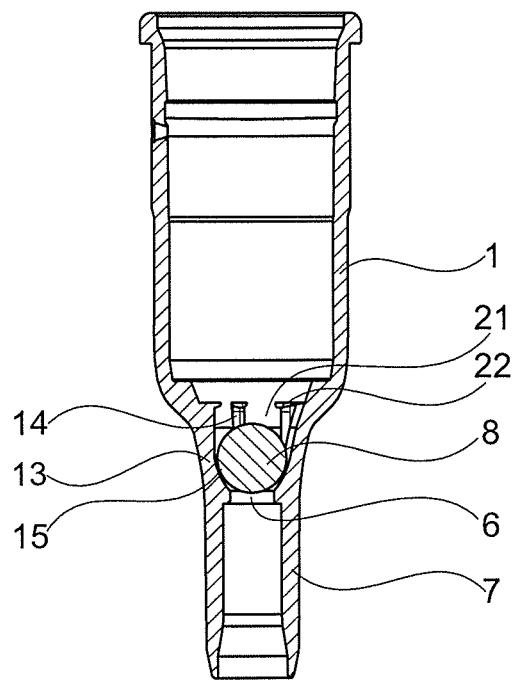
FIGS. 3a-3b show the body of the pump of FIG. 1 after plastic deformation of the upper ends of the ribs, respectively as a longitudinal section (FIG. 3a) and as a partial cut-off perspective (FIG. 3b), with the ball not shown in FIG. 3b.
Figure 3B:
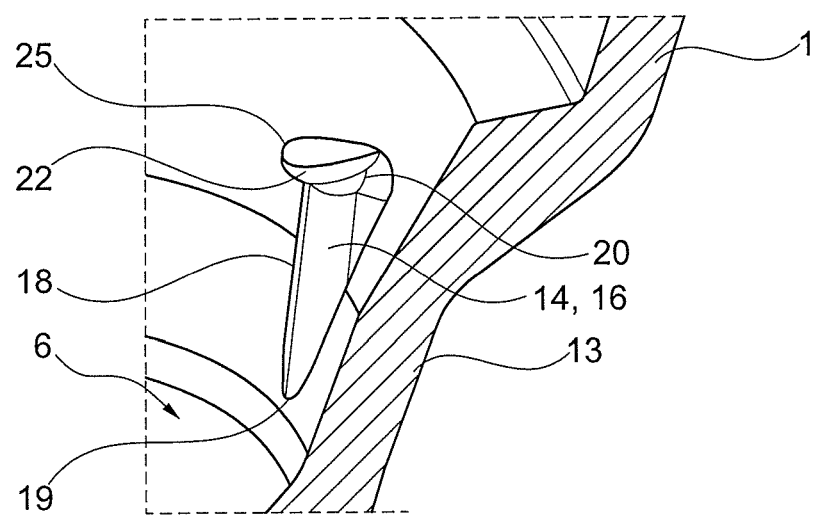

In the description, the terms of positioning in space are taken in reference to the position of the pump body shown in the figures.

In relation with the figures, a pump for dispensing a fluid product is described herein below. For example, the product can be a liquid, a gel, a lotion or a cream, in particular a care, makeup or perfumery cosmetic product, or a pharmaceutical product.

According to a preferred application, the pump is intended to be disposed on a bottle in the reservoir wherein the product is conditioned. The pump, via manual actuation, takes the conditioned product and pressurises it with a view to dispensing it, for example in the form of an aerosol, a stream or a dab of product.

The pump comprises a body having a casing 1 wherein a nozzle 2 is mounted in reversible translation on a dispensing/suction stroke of the product by forming in said casing a metering chamber 3 with variable volume. In particular, on the dispensing stroke, the volume of the metering chamber 3 decreases in order to pressurise the product that it contains and, on the suction stroke, the volume of said chamber increases in order to induce a vacuum.

Conventionally, the displacement of the nozzle 2 over its dispensing stroke is actuated by pressing on a push-button (not shown), with the return of said nozzle on its suction stroke being obtained by means of a spring 4. In the embodiment shown, the body is provided with an extender 5 wherein the nozzle 2 slides, the spring 4 being interposed between a flange 2a of said nozzle and said extender.

The metering chamber 3 is supplied with product by the intermediary of an inlet orifice 6 which is in communication with the conditioned product. In the embodiment shown, the inlet orifice 6 is formed in the bottom of the casing 1, said orifice surmounting a tubing 7 wherein the upper end of a plunger tube is intended to be press-fitted, with the lower end of said plunger tube being immersed in the reservoir.

The inlet orifice 6 is provided with a valve comprising a ball 8 which is retained in a cage in order to be able to be displaced between a closed position shown in the figures and an open position of said orifice. In particular, on the dispensing stroke of the nozzle 2, the pressure in the metering chamber 3 thrusts the ball 8 in a sealed manner on the inlet orifice 6 and, on the suction stroke of said nozzle, the vacuum in the metering chamber 3 lifts the ball 8 into open position of the inlet orifice 6 in order to allow for the supplying of said chamber with product.

The metering chamber 3 is also provided with an outlet valve which can be formed of a piston 9 mounted on the nozzle 2 in order to, respectively on the dispensing stroke and on the suction stroke of said nozzle, open and close the communication between the output channel 10 of said nozzle and the metering chamber 3. However, the invention is not limited to a particular mode for dispensing the product, in particular relatively to the operation of the pump.

In the embodiment shown, the nozzle 2 is provided with a valving element 11 and the pressure in the metering chamber 3 induces a relative sliding of said valving element and of the piston 9 in order to open channels 12 for transferring the product into the output channel 10. Furthermore, the push-button is mounted on the upper end of the nozzle 2 in order to place in communication said canal with a dispensing orifice.

The casing 1 comprises a peripheral wall 13 which surmounts the inlet orifice 6, said wall having ribs 14 in relief which extend axially. Furthermore, the valve comprises a seat 15 formed on the inlet orifice 6, with the ball 8 in closed position being thrust in a sealed manner on said seat and lifted from said seat in open position. In particular, the seat 15 has a spherical geometry analogous to that of the ball 8.

Each rib 14 has two lateral faces 16, 17 which join together along an internal edge 18 in order to form the cage between said edges. In particular, the ribs 14 have a lower end 19 which is arranged above the seat 15 and an upper end 20, with the internal edge 18 extending axially between said ends.

Moreover, the geometry of the interior of the peripheral wall 13 is tapered, with the radial dimension of the ribs 14 increasing from bottom to top in order to adapt to this geometry. In particular, the internal edges 18 are inscribed in a cylindrical geometry of which the radius is greater than that of the ball 8 in order to allow for its displacement between its open and closed positions. Advantageously, the radius inscribed is only slightly greater than that of the ball 8 in order to optimise the operation of the valve by favouring the axial displacement of said ball.

Furthermore, the ribs 14 are spaced angularly in order to form between them passages 21 for the product from the inlet orifice 6 to the metering chamber 3, said passages having a section that is sufficient to allow for the supplying of the metering chamber 3 via suction. In particular, the geometry of the ribs 14 is arranged in order to leave the passages 21 open when the ball 8 is being thrust on the internal edges 18.

The ball 8 is imprisoned in the cage by visors 22 which are formed on the upper ends 20, said visors forming an internal extension which is protruding radially in relation to the internal edge 18. In particular, the visors 22 are inscribed in a cylindrical geometry of which the radius is less than that of the ball 8. As such, the lifting of the ball 8 into open position is interrupted by axial bearing of said ball under the visors 22.

A method for producing a pump body is described hereinbelow wherein the casing 1 is moulded, in particular by injection into a mould of thermoplastic material of the polyolefin type. The mould is arranged in order to form the ribs 14 on the interior of the peripheral wall 13, with the upper end 20 of each of said ribs having a free upper surface.

The method includes introducing the ball 8 into the cage below the upper ends 20, in particular by arranging the ball 8 on the seat 15, then plastically deforming the upper ends 20 in order to form the visors 22 which extend radially towards the interior of the casing 1 in order to imprison the ball 8 in the cage. In particular, the ductility of the material forming the ribs 14 authorises the cold heading of their upper ends 20 in order to deform said ends by material creeping.

The ribs 14 are formed so that their free surface extends from one lateral edge 16 to the other 17 by forming a dome 23 having a top 24, with the plastic deformation of the upper ends 20 being carried out by causing a matrix to bear against said tops then via axial displacement of said matrix on a stroke for crushing domes 23.

As such, the creeping of the material is carried out starting from the top 24 of the dome 23, which limits the deformation stresses which can weaken the upper ends 20 since the quantity of crushed material increases progressively on the stroke of the matrix. Furthermore, the tangential creeping of the material is limited by the dome geometry 23 since it has less material on the sides, and this by optimising the radial creeping, in particular relatively to the quantity of radially creep material, in order to make reliable the carrying out of visors 22 able to imprison the ball 8. Finally, the carrying out of moulding cavities is simplified since a hollow dome 23 can be carried out via electro-erosion using electrodes without tips or by directly machining said cavities with a simple round bur, while still retaining the faculty of axial demoulding of the casing 1.

Advantageously, at least one portion of the free surface of the domes 23 has a convex geometry, in particular cylindrical, the tops 24 then being able to extend radially towards the interior of the casing 1 in order to favour the radial creeping by limiting the tangential creeping. Furthermore, the upper ends 20 can be deformed advantageously with a matrix having a bearing surface on the tops 24 which has a plane geometry which extends radially.

As such, visors 22 are formed having an upper planar surface surrounded by a peripheral edge 25 of cylindrical geometry which extends radially from the peripheral wall 13, with this type of geometry procuring a good compromise between retaining of the ball 8, dimension of the passages 21 for the product and limitation of deformation stresses.

In the embodiment shown, the domes 23 have a portion of external free surface 23a which is adjacent to the peripheral wall 13 and a portion of internal free surface 23b which is adjacent to the internal edge 18. Furthermore, the top 24 extends solely over the portion of external free surface 23a in order to favour the radial creeping towards the interior of the upper end 20.

In particular, the external free surface 23a has a cylindrical geometry with radius r1, with the internal edges 18 having a cylindrical geometry with radius r2. Advantageously, the radiuses r1 and r2 are the same so that the portion of internal free surface 23b has a spherical geometry. As such, in addition to the optimisation of the radial creeping towards the interior by limiting the deformation stresses, the moulding cavities of the ribs 14 can be carried out with a single round bur.

What is claimed is:

1. A method for producing a pump body for the dispensing of a fluid product, said body having a casing provided with an inlet orifice for said product which is provided with a valve comprising a ball retained in a cage in order to be displaced between a closed position and an open position of said orifice, said method providing for:
   moulding the casing by forming, on the interior of a peripheral wall surmounting the inlet orifice, ribs in relief which extend axially by being spaced angularly, each of said ribs having two lateral faces which join together along an internal edge in order to delimit the cage between said edges, as well as an upper end having a free upper surface;
   introducing the ball into the cage below the upper ends;
   plastically deforming the upper ends in order to form visors extending radially towards the interior of the casing, said visors being arranged in order to imprison the ball in the cage;
   said method being characterised in that the ribs are formed so that their free surface extends from one lateral face to the other by forming a dome having a top, with the plastic deformation of the upper ends being carried out by causing a matrix to bear against said tops then via axial displacement of said matrix on a stroke for crushing domes.

2. The method according to claim 1, characterised in that the internal edges have a cylindrical geometry.

3. The method according to claim 1, characterised in that the matrix has a bearing surface on the tops which has a plane geometry with extends radially.

4. The method according to claim 1, characterised in that the tops extend radially towards the interior of the casing.

5. The method according to claim 4, characterised in that the domes have a portion of external free surface which is adjacent to the peripheral wall and a portion of internal free surface which is adjacent to the internal edge, with the top extending solely on the portion of external free surface.

6. The method according to claim 1, characterised in that at least one portion of the free surface of the domes has a convex geometry.

7. The method according to claim 6, characterised in that the internal edges and the free surfaces of the domes have a cylindrical geometry with the same radius.

8. The method according to claim 1, characterised in that the domes have a portion of external free surface which is adjacent to the peripheral wall and a portion of internal free surface which is adjacent to the internal edge, with the top extending solely on the portion of external free surface.

9. The method according to claim 8, characterised in that the portion of external free surface has a cylindrical geometry.

10. The method according to claim 8, characterised in that the portion of internal free surface has a spherical geometry.

* * * * *